(12) United States Patent
Archer et al.

(10) Patent No.: US 7,634,388 B2
(45) Date of Patent: Dec. 15, 2009

(54) PROVIDING POLICY-BASED OPERATING SYSTEM SERVICES IN AN OPERATING SYSTEM ON A COMPUTING SYSTEM

(75) Inventors: Charles J. Archer, Rochester, MN (US); Michael A. Blocksome, Rochester, MN (US); Joseph D. Ratterman, Rochester, MN (US); Albert Sidelnik, St. Paul, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 11/553,095

(22) Filed: Oct. 26, 2006

(65) Prior Publication Data
US 2008/0103728 A1 May 1, 2008

(51) Int. Cl.
*G06F 19/00* (2006.01)

(52) U.S. Cl. ....................................................... 702/186

(58) Field of Classification Search ................... 702/186
See application file for complete search history.

(56) References Cited

OTHER PUBLICATIONS

Windows platform design notes, Designing Hardware for the Microsoft Windows Family of Operating Systems, Nov. 12, 2002, pp. 1-22.*
"Windows Native Processor Performance Control", Windows Platform Design Notes - Designing Hardware for the Microsoft Windows Family of Operating Systems, Nov. 12, 2002.

* cited by examiner

*Primary Examiner*—Tung S Lau
(74) *Attorney, Agent, or Firm*—Biggers & Ohanian, LLP

(57) ABSTRACT

Methods, apparatus, products are disclosed for providing policy-based operating system services in an operating system on a computing system. The computing system includes at least one compute node. The compute node includes an operating system. The operating system includes a kernel and a plurality of operating system services of a service type. Providing policy-based operating system services in an operating system on a computing system includes establishing, on the compute node, a kernel policy specifying one of the operating system services of the service type for use by the kernel in the operating system, establishing a performance ruleset, the performance ruleset specifying rules for analyzing the performance of the computing system, measuring performance of the computing system, and adjusting the kernel policy in dependence upon the performance ruleset and the measured performance.

9 Claims, 6 Drawing Sheets

PROVIDING POLICY-BASED OPERATING SYSTEM SERVICES IN AN OPERATING SYSTEM ON A COMPUTING SYSTEM

CROSS-REFERENCE TO RELATED APPLICATIONS

This application is related to U.S. patent application Ser. No. 11/553,040 entitled "PROVIDING POLICY-BASED OPERATING SYSTEM SERVICES IN AN OPERATING SYSTEM ON A COMPUTING SYSTEM", filed on Oct. 26, 2006; U.S. patent application Ser. No. 11/553,077 entitled "PROVIDING POLICY-BASED OPERATING SYSTEM SERVICES IN A HYPERVISOR ON A COMPUTING SYSTEM", filed on Oct. 26, 2006; and U.S. patent application Ser. No. 11/553,101 entitled "PROVIDING POLICY-BASED APPLICATION SERVICES TO AN APPLICATION RUNNING ON A COMPUTING SYSTEM", filed on Oct. 26, 2006; all of which are incorporated by reference herein.

BACKGROUND OF THE INVENTION

1. Field of the Invention

The field of the invention is data processing, or, more specifically, methods, apparatus, and products for providing policy-based operating system services in an operating system on a computing system.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area in which computer software has evolved to take advantage of high performance hardware is the operating system. Early computers lacked any form of operating system. A system administrator loaded an application that had sole use of the machine. To operate the computer, an application had to directly access and control the computer hardware. Later, computers came with libraries of support code which were linked into an application to assist in operations such as input and output. These libraries were the genesis of the modern-day operating system. The computers, however, still ran only a single application at a time. Modern operating systems are capable of running multiple applications simultaneously. These modern operating systems also provide applications with abstractions of the computer hardware to simplify application development and aid the ability to port applications from one hardware platform to another.

The kernel is the central part in most computer operating systems which manages the system's resources and the communication between hardware and software components. As a basic component of an operating system, a kernel provides abstraction layers for hardware, especially for memory, processors and I/O that allows hardware and software to communicate. The kernel also makes these facilities available to applications and other operating system services through inter-process communication mechanisms and system calls.

These kernel tasks are performed differently for different kernels, depending on their design and implementation. In a monolithic kernel, all operating system services reside in and are executed using the same memory area. Because a monolithic kernel attempts to execute all the code in the same address space, monolithic kernel architectures are easier to design and implement than other solutions and are extremely efficient if well-written. The main disadvantages of monolithic kernels are the dependencies between system components. Large kernels become very difficult to maintain, and a bug in one portion of the kernel may crash the entire system.

In a microkernel architecture, the kernel provides simple abstractions over the hardware, with a set of primitives or system calls to implement minimal operating system services such as, for example, memory management, multitasking, and inter-process communication. Other services, including those normally provided by the kernel such as, for example, networking, are implemented in user-space programs that typically have their own address space. Microkernels are easier to maintain than monolithic kernels, but the large number of system calls and context switches may slow down the system.

Regardless of the kernel architecture used to implement an operating system, the set of operating system services provided in current operating systems are generally fixed when the operating system is installed. That is, the operating system utilizes the same memory management algorithm, the same I/O scheduling algorithm, the same networking algorithm, and so on, without regard to the applications that run on the hardware managed by the operating system. Often, however, one application may efficiently utilize computer resources when using one operating system service, while another application inefficiently utilizes computer resources when using the same operating system service. For example, an operating system service that provides I/O scheduling in the operating system may result in efficient use of computer resources for an application that are I/O intensive and result in an inefficient use of computer resources for an application that is not I/O intensive. Because current operating systems provide the same operating system services without regard to applications, current operating systems often do not efficiently manage the interaction between applications and the computer hardware. Readers will therefore appreciate that room for improvement exists in the manner in which operating system service are provided in an operating system.

SUMMARY OF THE INVENTION

Methods, apparatus, products are disclosed for providing policy-based operating system services in an operating system on a computing system. The computing system includes at least one compute node. The compute node includes an operating system. The operating system includes a kernel and a plurality of operating system services of a service type. Providing policy-based operating system services in an operating system on a computing system includes establishing, on the compute node, a kernel policy specifying one of the operating system services of the service type for use by the kernel in the operating system, establishing a performance ruleset, the performance ruleset specifying rules for analyzing the performance of the computing system, measuring performance of the computing system, and adjusting the kernel policy in dependence upon the performance ruleset and the measured performance.

In addition, each operating system service may be characterized by operating parameters. Providing policy-based operating system services in an operating system on a computing system may also include adjusting the operating parameters of the specified operating system service in dependence upon the performance ruleset and the measured performance.

The computing system may also be implemented as a distributed computing system that includes one or more operating system service nodes. One or more of the operating system services may be distributed among the operating system service nodes. The kernel policy may also specify an operating system service node that is to provide the specified operating system service. Providing policy-based operating system services in an operating system on a computing system may also include administering the operating system service nodes in dependence upon the performance ruleset and the measured performance.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
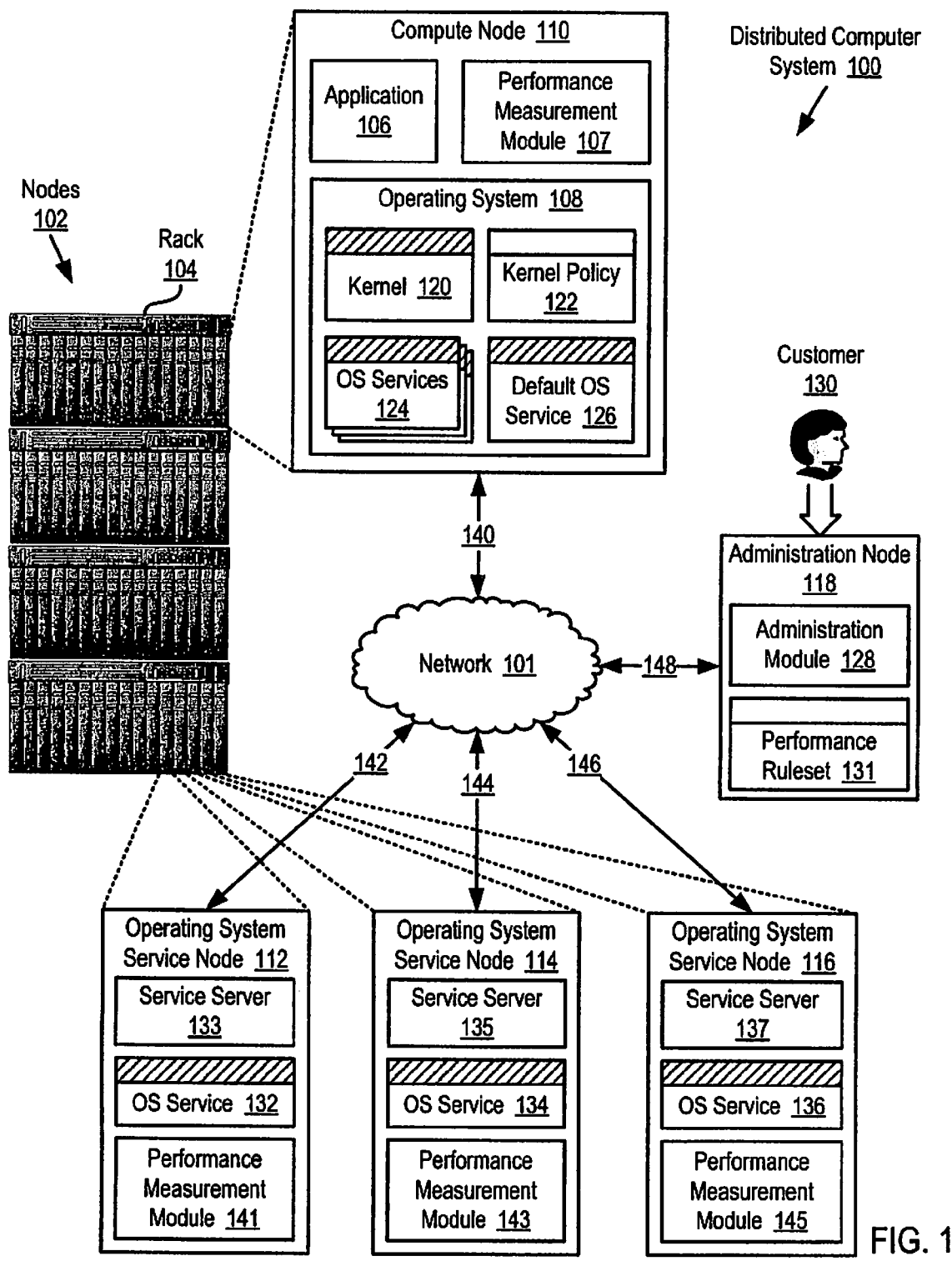
FIG. 1 sets forth a network diagram illustrating an exemplary computing system for providing policy-based operating system services in an operating system according to embodiments of the present invention.

Exemplary methods, apparatus, and products for providing policy-based operating system services in an operating system on a computing system according to embodiments of the present invention are described with reference to the accompanying drawings, beginning with FIG. 1. FIG. 1 sets forth a network diagram illustrating an exemplary computing system (100) for providing policy-based operating system services in an operating system according to embodiments of the present invention. The exemplary computing system (100) of FIG. 1 includes a compute node (110). The compute node (110) includes an operating system (108). The operating system (108) includes a kernel (120) and a plurality of operating system services (124) of a service type. The exemplary computing system (100) of FIG. 1 operates generally to provide policy-based operating system services in an operating system by establishing, on the compute node, a kernel policy (122) specifying one of the operating system services (124) of the service type for use in the operating system (108) and accessing, by the kernel (120), the specified operating system service. The exemplary computing system (100) of FIG. 1 operates generally to provide policy-based operating system services in an operating system according to embodiments of the present invention by establishing, on the compute node (110), a kernel policy specifying one of the operating system services (124) of the service type for use by the kernel (120) in the operating system (108), establishing a performance ruleset (131), the performance ruleset (131) specifying rules for analyzing the performance of the computing system (110), measuring performance of the computing system (100), and adjusting the kernel policy (122) in dependence upon the performance ruleset (131) and the measured performance.

In the example of FIG. 1, the exemplary computing system (100) is implemented as a distributed computing system. A distributed computing system is a computing system that uses two or more network connected computing devices to accomplish a common task. The distributed computer system (100) of FIG. 1 includes the compute node (110), operating system service nodes (112, 114, 116), and an administration node (118) connected together for data communications through network (101). The compute node (110) connects to network (101) through wireline connection (140). The operating system service node (112) connects to network (101) through wireline connection (142). The operating system service node (114) connects to network (101) through wireline connection (144). The operating system service node (116) connects to network (101) through wireline connection (146). The administration node (118) connects to network (101) through wireline connection (148). The common task in the distributed computing system (100) of FIG. 1 includes providing a policy-based operating system services in an operating system according to embodiments of the present invention.

In the example of FIG. 1, the compute node (110) is implemented using one of the nodes (102) installed in a computer rack (104). Each node (102) of FIG. 1 is a processing device that executes computer program instructions. Each node (102) includes one or more computer processors and computer memory operatively coupled to the computer processors. The nodes (102) of FIG. 1 are implemented as blade servers installed in server chassis that are, in turn, mounted on the computer rack (104). Readers will note, however, that implementing the nodes as blade servers is for explanation and not for limitation. In fact, the nodes of FIG. 1 may be implemented as network connected workstations, computers connected together to form a computer cluster, computing devices in a parallel computer, or any other implementation as will occur to those of skill in the art.

In the example of FIG. 1, the compute node (110) is a node configured with a kernel (120) and a kernel policy (122) useful in providing policy-based operating system services in an operating system on a computing system according to embodiments of the present invention. Typically, the kernel policy (122) is established on the compute node to optimize the utilization of node resources by an application (106) configured for execution on the node. The application (106) is a set of computer program instructions implementing user-level data processing. The application may be a stand-alone application in which all the computer program instructions of the application (106) are executed on a single compute node, or the application (106) may be a distributed application in which portions of the computer program instructions are executed serially or in parallel with other portions of the computer program instructions being executed on other compute nodes.

In the exemplary system (100) of FIG. 1, the operating system (108) controls the execution of the application (106) on the compute node (110). The operating system (108) of FIG. 1 is system software that manages the hardware and software resources of a processing device such as the compute node (110). The operating system (108) performs basic tasks such as, for example, controlling and allocating memory, prioritizing the processing of instructions, controlling input and output devices, facilitating networking, and managing files.

The application (106) of FIG. 1 accesses resources provided by the operating system (108) through the kernel (120). The kernel (120) is the core component of the operating system (108) that manages the system's resources and the communication between hardware and software components. The kernel (120) provides software applications with abstraction layers for hardware that allow hardware and software to communicate. The kernel (120) makes these abstraction layers available to user-level applications and other operating system components through inter-process communication mechanisms and a kernel application programming interface ('API') (121).

In the exemplary system (100) of FIG. 1, the operating system (108) is implemented using a microkernel architecture. That is, the kernel (120) includes implementations of basic types of operating system services such as memory management, process management, and inter-process communication. Other operating system services (124) such as, for example, networking, interrupt handling, I/O scheduling, device drivers, file system services, and so on, however, are implemented using separate operating system components, each component having a thread of execution distinct from the kernel (120). The kernel (120) accesses these operating system services (124) using inter-process communication or a system call to the service's API (125).

In the exemplary system (100) of FIG. 1, each operating system service (124) is system software that either implements a service type not implemented in the kernel (120) itself or implements a specialized version of a service type already provided by the kernel (120). For explanation, consider, for example, that the kernel (120) of FIG. 1 does not implement any services of the file system service type. In such an example, one of the operating system services (124) may implement a file system service for the Unix File System, while a second operating system service (124) may implement a file system service for the Reiser File System. Depending on the kernel policy (122) configured in the operating system (108), the kernel (120) would provide file system services using either the Unix File System or the Reiser File System. Consider, further for example, that the kernel (120) of FIG. 1 implements a generic memory management service. In such an example, one of the operating system services (124) may implement a memory management service tailored for intensive I/O operations that the kernel (120) may use instead of the generic memory management algorithm implemented in the kernel (120) depending on the configuration of the kernel policy (122).

Each operating system service (124) of FIG. 1 provides an operating system service of a particular service type. The types of service provided by the operating system services (124) may include, for example, task schedulers, file systems, memory management, device drivers, I/O schedulers, interrupt/signal handling, security, job submission, tty handling, and so on. The operating system services for services of the same service type have a same application programming interface. That is, the service API (125) for each service (124) of a particular service type have the same set of member methods and parameters that the kernel (120) may use to access the operating system services (124). Because the services of each service type have the same service API, the kernel (120) may access the operating system service specified in the kernel policy (122) using the same application programming interface regardless of which operating system service is specified in the kernel policy (122) for the particular service type.

In the exemplary system (100) of FIG. 1, one or more of the operating system services (124) are distributed among the operating system service nodes (112, 114, 116). That is, the computer program instructions for implementing one or more of the operating system services (124) reside on the operating system service nodes (112, 114, 116). The corresponding operating system services (124) for each of the services (132, 134, 136) may be implemented as copies of the computer program instructions implementing each of the services (132, 134, 136). The corresponding operating system services (124) for each of the services (132, 134, 136) may also be implemented using a data communications subsystem that accesses the operating system services (132, 134, 136) on the operating system service nodes (112, 114, 116). Examples of such a data communication subsystem may include a web services engine, a CORBA object on the compute node (110) that accesses the operating system services (132, 134, 136) on the operating system service nodes (112, 114, 116) using remote procedure calls, use of an MPI library, or any other implementation as will occur to those of skill in the art.

'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional remote procedure calls. CORBA uses a declarative language, the Interface Definition Language ("IDL"), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

'MPI' refers to 'Message Passing Interface,' a prior art parallel communications library, a module of computer program instructions for data communications on parallel computers. Examples of prior-art parallel communications libraries that may be useful for providing policy-based operating system services in an operating system on a computing system according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among nodes running a parallel program on a distributed memory parallel computer. This specification sometimes uses MPI terminology for ease of explanation, although the use of MPI as such is not a requirement or limitation of the present invention.

In the example of FIG. 1, the operating system service nodes (112, 114, 116) are implemented using the nodes (102)

installed in the computer rack (104). Each operating system service node (112, 114, 116) is a node that provides operating system services to a kernel installed on a compute node. Each operating system service node may provide one or more operating system services to one or more kernels running on one or more compute nodes. In distributed computing systems with many nodes, however, each operating system service node typically provides only one operating system service due to the abundance of nodes in the system. In the example of FIG. 1, the operating system service node (112) provides operating system service (132) to kernel (120); the operating system service node (114) provides operating system service (134) to kernel (120); and the operating system service node (116) provides operating system service (136) to kernel (120).

To provide operating system services to the kernel (120), each operating system service node (112, 114, 116) of FIG. 1 has installed upon it an operating system service server. The operating system service node (112) includes service server (133), the operating system service node (114) includes service server (135), and the operating system service node (116) includes service server (137). Each service server (133, 135, 137) is a software component that provides an operating system service to a kernel in response to a request sent by a kernel of an operating system or in response to receiving an instruction from a system administrator. Each operating system service server (133, 135, 137) may provide an operating system service to a kernel by transmitting the computer program instructions implementing the requested operating system service to the kernel and allowing the compute node on which the kernel is installed to execute the computer program instructions. Each operating system service server (133, 135, 137) may also provide an operating system service by instructing the operating system service node of the server to execute the computer program instructions implementing the requested operating system service. The kernel (120) may communicate with the operating system service servers (133, 135, 137) using web services, calling member methods of a CORBA object, use of an MPI library, or any other data communications implementation as will occur to those of skill in the art.

As mentioned above, the operating system (108) includes two or more operating system services (124) for a particular service type. For example, the operating system (108) may include two different implementations of file system services for use by the kernel depending on the configuration of the exemplary system (100). In another example, the operating system (108) may include two different implementations of memory management services depending on the needs of the application (106). Having more than one operating system service for a particular service type advantageously provides the flexibility to optimize the operating system's service algorithms according to the hardware and software environment that the operating system (108) manages.

The kernel policy (122) of FIG. 1 is a table that maps one of the operating system services (124) to a type of operating system service used by the kernel (120). The kernel (120) uses the kernel policy (122) to identify which operating system service to use in the operating system for a particular service type. Regardless of whether the operating system services (124) reside locally on the compute node (110) or are distributed on other nodes such as operating system service nodes (112, 114, 116), the kernel policy (122) specifies one of the operating system services of a particular service type for use in the operating system (108). When the operating system service specified in the kernel policy is distributed on one of the operating system service nodes (112, 114, 116), the kernel policy (122) also specifies an operating system service node that is to provide the specified operating system service. Using the kernel policy (122), the kernel (120) provides policy-based operating system services in an operating system on a computing system according to embodiments of the present invention by accessing the operating system service specified in the policy (122).

Often the kernel policy (122) will not specify an operating system service for one of the service types used in the operating system (108) or the kernel (120) will be unable to access the operating system service specified in the policy (122). In the example of FIG. 1, the operating system (108) therefore includes a default operating system service (126). The default operating system service (126) is an operating system service of a particular service type that the kernel (120) may use when the kernel policy (122) does not specify an operating system service for the particular service type or the kernel (120) is unable to access the operating system service specified in the policy (122). Consider, for example, that the kernel policy (122) does not specify a file system service for use by the operating system (108), that the kernel (120) does not implement a file system service itself, and that the default operating system service implements the Unix File System. Because the kernel (120) does not implement a file system service and no file system service is specified in the kernel policy (122), the kernel (120) in such an example will use the default operating system service (126) implementing the Unix File System. The kernel (120) may access the default operating system service (126) using inter-process communication or the default operating system service API (127).

In the exemplary of FIG. 1, each node (110, 112, 114, 116) includes a performance measurement module. The compute node (110) of FIG. 1 includes a performance measurement module (107). The operating system service node (112) of FIG. 1 includes a performance measurement module (141). The operating system service node (114) of FIG. 1 includes a performance measurement module (143). The operating system service node (116) of FIG. 1 includes a performance measurement module (145).

In the example of FIG. 1, each performance measurement module (107, 141, 143, 145) is a software component for providing policy-based operating system services in an operating system on a computing system according to embodiments of the present invention. Each performance measurement module (107, 141, 143, 145) includes a set of computer program instructions for measuring performance of the computing system (100). In the example of FIG. 1, more particularly, the performance measurement module (107) measures the performance of compute node (110) and the software executing on compute node (110). The performance measurement module (141) measures the performance of operating system service node (112) and the software executing on the node (112). The performance measurement module (143) measures the performance of operating system service node (114) and the software executing on the node (114). The performance measurement module (145) measures the performance of operating system service node (116) and the software executing on the node (116). Examples of the performance measured may include the percentage of processor utilization used by each process being executed by the processors in the computing system (100), the percentage of available processing time for each processor in the computing system (100), the number of page faults that occur on each processor in the computing system (100), the amount of available memory accessible by each processor in the computing system (100), the amount of memory occupied by the software components executing on each processor, and so on.

Such performance measurements may be used to adjust the kernel policy (122) to optimize the configuration of the computing system (100).

In the example of FIG. 1, the distributed computing system (100) is configured by a system administrator (130) through an administration node (118). The administration node (118) of FIG. 1 is a computing device that administers the configuration of the computing system (100) of FIG. 1. The administration node (118) may be implemented as one of the nodes (102) installed in the rack (104), a workstation network connected to the nodes (102), or any other computer as will occur to those of skill in the art.

In the exemplary system (100) of FIG. 1, the administration module (118) has installed upon it an administration module (128). The administration module (128) is a software component through which a system administrator (130) configures the exemplary computer system (100). The administration module (128) allows a system administrator (130) to configure the exemplary computer system (100) by providing a user interface for the system administrator (130) to interact with the administration module (128) and by configuring operating system (108) and the application (106) provided by the system administrator (130) on one or more compute nodes such as, for example, the compute node (110). The administration module (128) includes a set of computer program instructions for providing policy-based operating system services in an operating system on a computing system by establishing, on the compute node (110), a kernel policy specifying one of the operating system services (124) of a service type for use in the operating system (108) according to embodiments of the present invention.

The administration module (128) of FIG. 1 also includes a set of computer program instructions for providing policy-based operating system services in an operating system on a computing system by establishing a performance ruleset (131). In the example of FIG. 1, the performance ruleset (131) is a table that specifies rules for analyzing the performance of the computing system (100). To obtain the performance of the computing system (100), the administrative module (128) may poll each node (110, 112, 114, 116) for their measured performance, or each node (110, 112, 114, 116) may periodically transmit their measured performance to the administration mode (118).

The administration module (128) of FIG. 1 also includes a set of computer program instructions for providing policy-based operating system services in an operating system on a computing system by adjusting the kernel policy (122) in dependence upon the performance ruleset (131) and the measured performance (318), adjusting the operating parameters of the operating system services (124) in dependence upon the performance ruleset (131) and the measured performance, and administering the operating system service nodes in dependence upon the performance ruleset (131) and the measured performance. After adjusting the operating parameters of the operating system services (124) distributed on the nodes (112, 114, 116), the administration node (118) may transmit a message to the kernel (120) indicating that the kernel (120) needs to obtain the latest version of the operating system service distributed on the nodes (112, 114, 116). The administrative module (128) may communicate with the nodes (110, 112, 114, 116) through a data communication connection implemented using shared memory space, a CORBA framework, a JTAG network, web services, a MPI library, or any other data communication implementation as will occur to those of skill in the art.

'JTAG' is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient 'back door' into the system. Using a JTAG network, the administration module may efficiently configure processor registers and memory in the nodes (110, 112, 114, 116) for use in providing policy-based operating system services in an operating system on a computing system according to embodiments of the present invention.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), the MPI protocol, and others as will occur to those of skill in the art. Various embodiments of the present invention may be implemented on a variety of hardware platforms in addition to those illustrated in FIG. 1. For example, the computing system useful for providing policy-based operating system services in an operating system according to embodiments of the present invention may also be implemented as a parallel computer such as, for example, IBM's BlueGene/L.

Providing policy-based operating system services in an operating system on a computing system in accordance with the present invention is generally implemented with computers, that is, with automated computing machinery. In the system of FIG. 1, for example, all the nodes are implemented to some extent at least as computers. For further explanation, therefore, FIG. 2 sets forth a block diagram of automated computing machinery comprising an exemplary compute node (110) useful in providing policy-based operating system services in an operating system on a computing system according to embodiments of the present invention. The compute node (110) of FIG. 2 includes at least one computer processor (156) or 'CPU' as well as random access memory (168) ('RAM') which is connected through a high speed memory bus (166) and bus adapter (158) to processor (156) and to other components of the compute node.

Figure 2:
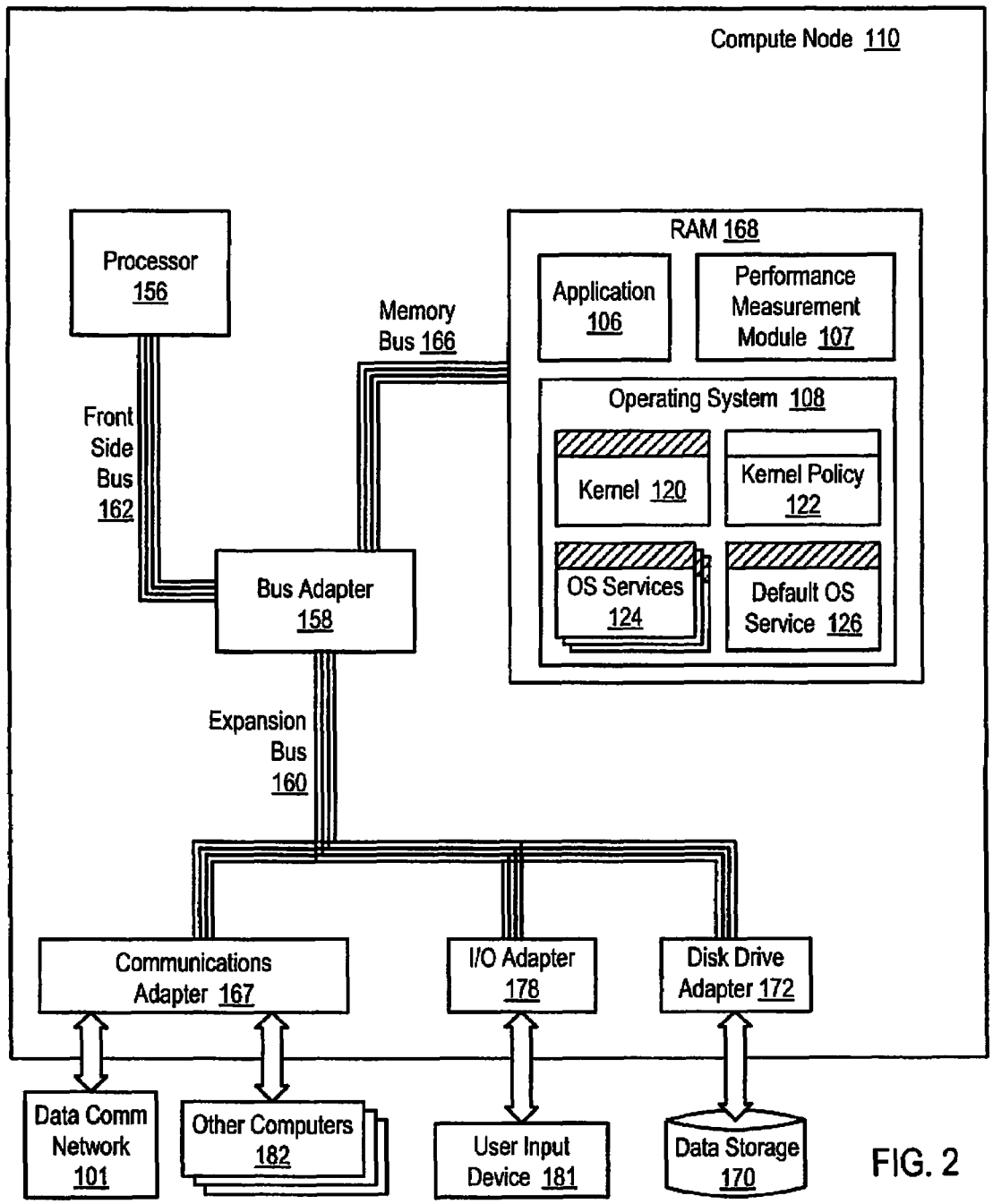
FIG. 2 sets forth a block diagram of automated computing machinery comprising an exemplary compute node useful in providing policy-based operating system services in an operating system on a computing system according to embodiments of the present invention.

Stored in RAM (168) is an application (106), a performance measurement module (107), and an operating system (108). The operating system (108) includes a kernel (120), a kernel policy (122), operating system services (124), and default operating system service (126). As mentioned above, the application (106) is a set of computer program instructions implementing user-level data processing. The kernel policy (122) of FIG. 2 is a table that maps one of the operating system services (124) to a type of operating system service used by the kernel (120). The performance measurement module (107), the kernel (120), the operating system services (124), and the default operating system service (126) illustrated in FIG. 2 are software components, that is computer program instructions, that operate as described above with reference to FIG. 1 regarding the compute node. Operating systems that may be improved for providing policy-based operating system services in an operating system on a computing system in accordance with the present invention may include UNIX™, Linux™, Microsoft NT™, IBM's AIX™, IBM's i5/OS™, and others as will occur to those of skill in the art. The application (106), the performance measurement module (107), and the operating system (108) in the example of FIG. 2 are shown in RAM (168), but many components of such software typically are stored in non-volatile memory also, for example, on a disk drive (170).

The exemplary compute node (110) of FIG. 2 includes bus adapter (158), a computer hardware component that contains drive electronics for high speed buses, the front side bus (162), and the memory bus (166), as well as drive electronics for the slower expansion bus (160). Examples of bus adapters useful in compute nodes useful according to embodiments of the present invention include the Intel Northbridge, the Intel Memory Controller Hub, the Intel Southbridge, and the Intel I/O Controller Hub. Examples of expansion buses useful in compute nodes useful according to embodiments of the present invention may include Peripheral Component Interconnect ('PCI') buses and PCI Express ('PCIe') buses.

Although not depicted in the exemplary compute node (110) of FIG. 2, the bus adapter (158) may also include drive electronics for a video bus that supports data communication between a video adapter and the other components of the compute node (110). FIG. 2 does not depict such video components because a compute node is typically implemented as a blade server installed in a server chassis or a node in a parallel computer with no dedicated video support. Readers will note, however, that a compute node useful in embodiments of the present invention may include such video components.

The exemplary compute node (110) of FIG. 2 also includes disk drive adapter (172) coupled through expansion bus (160) and bus adapter (158) to processor (156) and other components of the exemplary compute node (110). Disk drive adapter (172) connects non-volatile data storage to the exemplary compute node (110) in the form of disk drive (170). Disk drive adapters useful in compute nodes include Integrated Drive Electronics ('IDE') adapters, Small Computer System Interface ('SCSI') adapters, and others as will occur to those of skill in the art. In addition, non-volatile computer memory may be implemented for a compute node as an optical disk drive, electrically erasable programmable read-only memory (so-called 'EEPROM' or 'Flash' memory), RAM drives, and so on, as will occur to those of skill in the art.

The exemplary compute node (110) of FIG. 2 includes one or more input/output ('I/O') adapters (178). I/O adapters in compute node implement user-oriented input/output through, for example, software drivers and computer hardware for controlling output to display devices such as computer display screens, as well as user input from user input devices (181) such as keyboards and mice. Although not depicted in the example of FIG. 2, compute nodes in other embodiments of the present invention may include a video adapter, which is an example of an I/O adapter specially designed for graphic output to a display device such as a display screen or computer monitor. A video adapter is typically connected to processor (156) through a high speed video bus, bus adapter (158), and the front side bus (162), which is also a high speed bus.

The exemplary compute node (110) of FIG. 2 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for providing policy-based operating system services in an operating system on a computing system according to embodiments of the present invention include modems for wired dial-up communications, IEEE 802.3 Ethernet adapters for wired data communications network communications, and IEEE 802.11b adapters for wireless data communications network communications.

Although FIG. 2 is discussed with reference to an exemplary compute node, readers will note that automated computing machinery comprising exemplary operating system service nodes and exemplary administration nodes useful in providing policy-based operating system services in an operating system on a computing system according to embodiments of the present invention are similar to the exemplary compute node (110) of FIG. 2. That is, such exemplary operating system service nodes and exemplary administration nodes include one or more processors, bus adapters, buses, RAM, communications adapters, I/O adapters, disk drive adapters, and other components similar to the exemplary compute node (110) of FIG. 2 as will occur to those of skill in the art.

Figure 3:
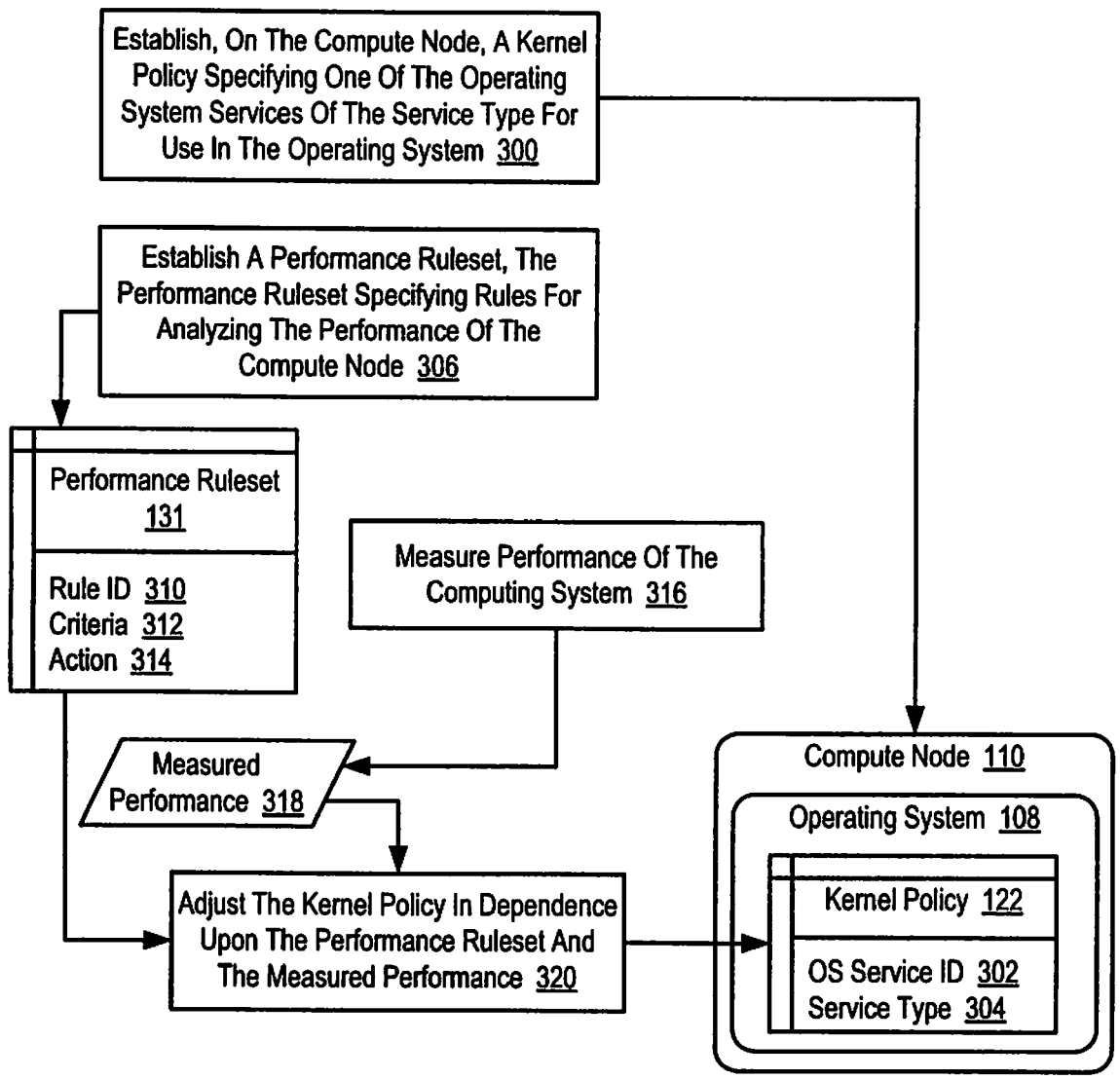
FIG. 3 sets forth a flow chart illustrating an exemplary method for providing policy-based operating system services in an operating system on a computing system according to embodiments of the present invention.

For further explanation, FIG. 3 sets forth a flow chart illustrating an exemplary method for providing policy-based operating system services in an operating system on a computing system according to embodiments of the present invention. The computing system includes at least one compute node (110). The compute node includes an operating system (108). The operating system (108) includes a kernel and a plurality of operating system services of a service type.

The method of FIG. 3 includes establishing (300), on the compute node, a kernel policy (122) specifying one of the operating system services of a service type for use in the operating system. The kernel policy (122) of FIG. 3 is a table that maps an operating system service to a type of operating system service used by the kernel. In the example of FIG. 3, each record of the kernel policy (122) identifies which operating system service to use in the operating system for a particular service type. To identify which operating system service to use in the operating system for a particular service type, each record of the kernel policy (122) includes an operating system service identifier (302) and a service type (304). Examples types (304) of operating system services that may be specified in the kernel policy (122) may include task schedulers, file systems, memory management, device drivers, I/O schedulers, interrupt/signal handling, security, job submission, tty handling, and so on. For an example of a kernel policy (122) useful in providing policy-based operating system services in an operating system on a computing system according to embodiments of the present invention, consider the following table:

TABLE 1

Example Kernel Policy

| OS Service ID | Service Type |
|---|---|
| UFS_Service | File_System |
| Round_Robin_MM_Algorithm | Memory_Management |
| Limited_I/O_Access | I/O_Scheduler |

In the exemplary kernel policy of Table 1, associating the value 'UFS_Service' for the operating system service identifier (302) with the value 'File_System' for the service type (304) specifies that the kernel use the operating system service that implements the Unix File System when the kernel needs to access a file system service type. Associating the value 'Round_Robin_MM_Algorithm' for the operating system service identifier (302) with the value 'Memory_Management' for the service type (304) specifies that the kernel use the operating system service that implements a round robin algorithm when the kernel need to access a memory management service type. Associating the value 'Limited_I/O_Access' for the operating system service identifier (302) with the value 'I/O_Scheduler' for the service type (304) specifies that the kernel use the operating system service that implements limited I/O access when the kernel uses a I/O scheduler service type. Readers will note that exemplary kernel policy (122) above is for explanation and not for limitation. Other kernel policies as will occur to those of skill in the art may also be useful in providing policy-based operating system services in an operating system on a computing system according to embodiments of the present invention.

In the method of FIG. 3, establishing (300), on the compute node, a kernel policy (122) specifying one of the operating system services of a service type for use in the operating system may be carried out by receiving, in an administration module from a system administrator, a mapping between the operating system services and the service types and creating, by the administration module, the kernel policy (122) on the compute node according to the mappings. The administration module is a software component that the system administration may use to configure the computing system that includes the compute node. The particular compute node on which the administration module creates the kernel policy (122) is typically specified by the system administrator through a user interface provided by the administration module. The administration module may be installed directly on the compute node or any other computer network connected to the compute node. The administration module may create the kernel policy (122) on the compute node through a data communication connection implemented using shared memory space, a CORBA framework, a JTAG network, web services, a MPI library, or any other data communication implementation as will occur to those of skill in the art.

The method of FIG. 3 also includes establishing (306) a performance ruleset (131). The performance ruleset (131) is a table that specifies rules for analyzing the performance of the computing system. In the example of FIG. 3, each record of the performance ruleset (131) identifies an action to be performed when the performance of the computing system satisfies predetermined criteria. To identify an action to be performed when the performance of the computing system satisfies predetermined criteria, each record of the performance ruleset (131) includes a rule identifier (310), criteria (312), and an action (314). For an example of a performance ruleset (131) useful in providing policy-based operating system services in an operating system on a computing system according to embodiments of the present invention, consider the following table:

TABLE 2

Example Performance Ruleset

| Rule ID | Criteria | Action |
| --- | --- | --- |
| 1 | CN.MMProcess > 2% & CN.MMProcess ≦ 5% | CN.Adjust_MM_Service |
| 2 | CN.MMProcess > 5% | CN.Switch_MM_Service |

TABLE 2-continued

Example Performance Ruleset

| Rule ID | Criteria | Action |
| --- | --- | --- |
| 3 | OSSN1.ServerProcess > 95% | OSSN1.Add_Node |
| 4 | OSSN1.ServerProcess < 40% | OSSN1.Reconfig_Node |

In exemplary rule '1' of the performance ruleset of Table 2, associating the value 'CN.MMProcess>2% & CN.MMProcess≦5%' for the criteria (312) with the value 'CN.Adjust_MM_Service' for the action (413) specifies adjusting the operating parameters of the current memory management service of the compute node when the process of the memory management service consumes on average more than two percent and less than five percent of the processor utilization of the compute node's processors. In exemplary rule '2', associating the value 'CN.MMProcess>5%' for the criteria (312) with the value 'CN.Switch_MM_Service' for the action (413) specifies adjusting the kernel policy (122) of the compute node to switch the memory management service used by the kernel when the process of the memory management service consumes on average more than five percent of the processor utilization of the compute node's processors.

The exemplary rules '3' and '4' of the performance ruleset of Table 2 demonstrate exemplary rules that may be useful when one or more of the operating system services are distributed among one or more operating system service nodes. In exemplary rule '3', associating the value 'OSSN1.ServerProcess>95%' for the criteria (312) with the value 'OSSN1.Add_Node' for the action (413) specifies allocating an additional operating system service node that provides the same operating system services as the operating system service node 'OSSN1' when the process of the service server on the operating system service node 'OSSN1' consumes on average more than ninety-five percent of the processor utilization of the operating system service node 'OSSN1's processors. In exemplary rule '4', associating the value 'OSSN1.ServerProcess<40%' for the criteria (312) with the value 'OSSN1.Recong_Node' for the action (413) specifies reconfiguring the operating system service node 'OSSN1' to provide a different set of operating system services when the process of the service server on the operating system service node 'OSSN1' consumes on average less than forty percent of the processor utilization of the operating system service node 'OSSN1's processors. Readers will note that exemplary performance ruleset of Table 2 above is for explanation and not for limitation. Other performance rulesets as will occur to those of skill in the art may also be useful in providing policy-based operating system services in an operating system on a computing system according to embodiments of the present invention. Establishing (306) a performance ruleset (131) according to the method of FIG. 3 may be carried out by receiving, in an administration module from a system administrator, a set of actions and corresponding criteria that specify when the actions are to be performed based on the performance of the computing system, and creating the performance ruleset (131) according to the received actions and corresponding criteria. The administration module is a software component that the system administration may use to configure the computing system that includes the compute node. The particular compute node on which the administration module creates the performance ruleset (131) is typically specified by the system administrator through a user interface provided by the administration module. The administration module may be installed directly on the compute node or any other computer network connected to the compute node. The administration module may create the performance ruleset (131) on the compute node through a data communication connection implemented using shared memory space, a CORBA framework, a JTAG network, web services, a MPI library, or any other data communication implementation as will occur to those of skill in the art.

The method of FIG. 3 includes measuring (316) performance (318) of the computing system. The measured performance (318) of FIG. 3 represents the performance of the nodes and the software running on the nodes of the computing system. Examples of measured performance (318) may include the percentage of processor utilization used by each process being executed by the processors in the computing system, the percentage of idle time for each processor in the computing system, the number of page faults that occur on each processor in the computing system, the amount of available memory accessible by each processor in the computing system, the amount of memory occupied by the software components executing on each processor, and so on. The performance of the computing system may be measured by a performance measurement module that runs as a process on each node of the computing system. The performance measurement module may measure (316) the performance of the computing system by measuring the performance of the compute node or by measuring performance of one or more operating system service nodes. The performance measurement module may measure (316) the performance of the computing system according to the method of FIG. 3 by taking a plurality of measurements for a predetermined performance metric for a node of the computing system over a period of time and averaging the measured values.

The method of FIG. 3 also includes adjusting (320) the kernel policy (122) in dependence upon the performance ruleset (131) and the measured performance (318). Adjusting (320) the kernel policy (122) in dependence upon the performance ruleset (131) and the measured performance (318) according to the method of FIG. 3 may be carried out by the administration module mentioned above. The administration module may adjust (320) the kernel policy (122) according to the method of FIG. 3 by comparing the measured performance (318) with the criteria (312) for each record in the performance ruleset (131). If the measured performance (318) satisfies the criteria (312) of one of the records, then the administration module may execute the action (314) associated with the criteria (312) satisfied by the measured performance (318). The action (314) associated with the criteria (312) satisfied by the measured performance (318) may identify computer program instructions for carrying out adjustments to the kernel policy (122). Such adjustments advantageously operate to reconfigure the operating system services used by the kernel in the operating system in an effort to optimize the performance of the computing system or adapt the computing system to a changing environment.

Figure 4:
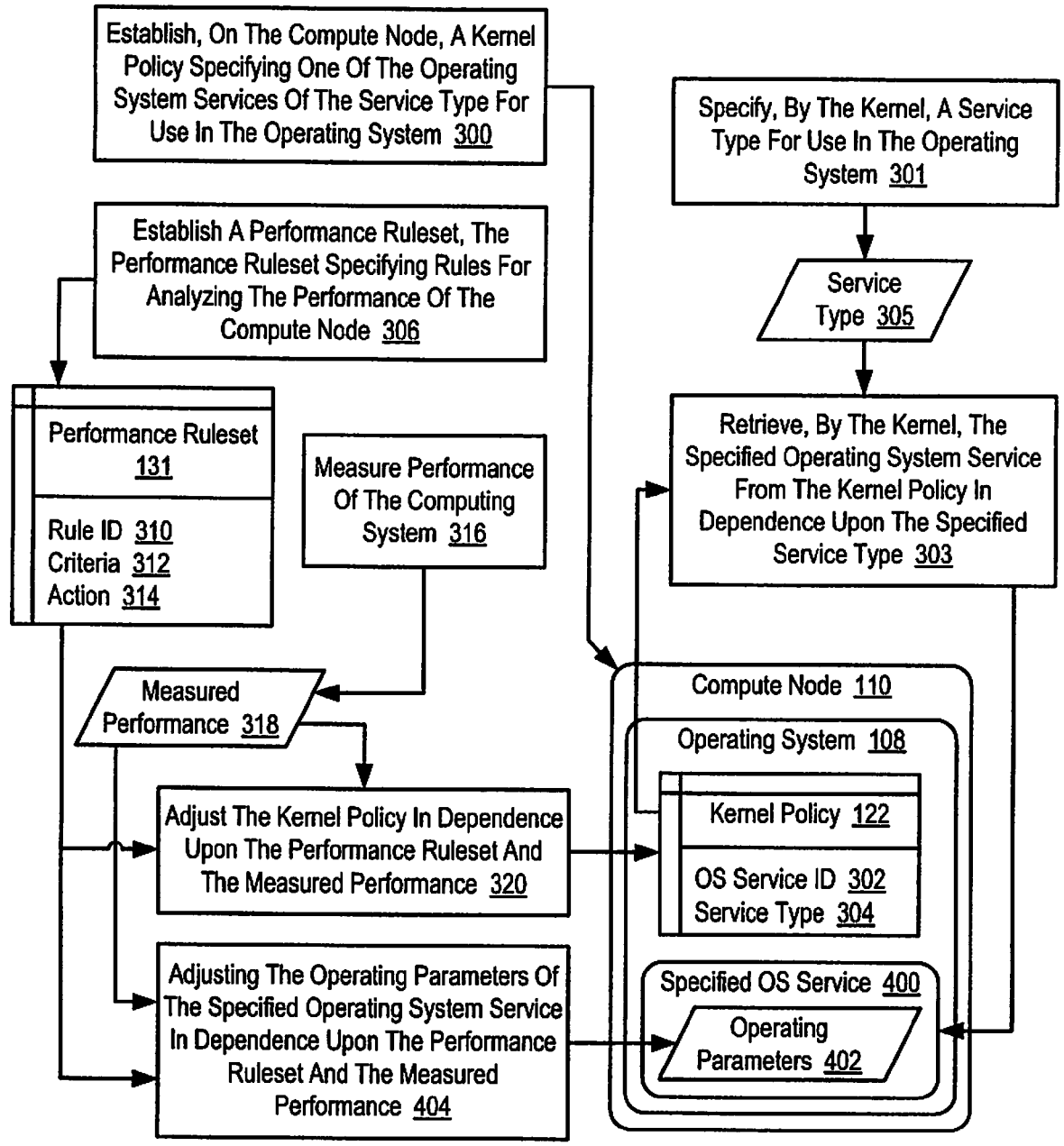
FIG. 4 sets forth a flow chart illustrating a further exemplary method for providing policy-based operating system services in an operating system on a computing system according to embodiments of the present invention.

In addition to adjusting the kernel policy in dependence upon the performance ruleset and the measured performance, the operating parameters of an operating system service specified in a kernel policy for use in the operating system may also be adjusted in dependence upon the performance ruleset and the measured performance. Adjusting the operating parameters of an operating system service specified in a kernel policy may be advantageous when the performance of the current operating system service can be adjusted more efficiently than switching to a different operating system service of the same type. For further explanation, therefore, FIG. 4 sets forth a flow chart illustrating a further exemplary method for providing policy-based operating system services in an operating system on a computing system according to embodiments of the present invention that includes adjusting (404) the operating parameters (402) of the specified operating system service (400) in dependence upon the performance ruleset (131) and the measured performance (318). In the example of FIG. 4, the computing system includes at least one compute node (110). The compute node (110) includes an operating system (108). The operating system includes a kernel and a plurality of operating system services of a service type.

The method of FIG. 4 is similar to the method of FIG. 3 in that the method of FIG. 4 includes establishing (300), on the compute node, a kernel policy (122) specifying one of the operating system services of the service type for use by the kernel in the operating system, establishing (306) a performance ruleset (131), the performance ruleset (131) specifying rules for analyzing the performance of the computing system, measuring (316) performance (318) of the computing system, and adjusting (320) the kernel policy (122) in dependence upon the performance ruleset (131) and the measured performance (318). The example of FIG. 4 is also similar to the example of FIG. 3 in that the kernel policy (122) of FIG. 4 includes an operating system service identifier (302) and a service type (304). The example of FIG. 4 is also similar to the example of FIG. 3 in that the performance ruleset (131) includes rule identifier (310), criteria (312), and an action (314).

The method of FIG. 4 also includes specifying (301), by the kernel, a service type (305) for use in the operating system. The kernel may specify (301) a service type (305) for use in the operating system according to the method of FIG. 4 by including an instruction that contains the service type (305) in the computer program instructions implementing the kernel at a particular point along the flow of execution. For example, at a particular point along the flow of execution for the kernel, the computer program instructions implementing the kernel may contain machine code representing the following instruction:

Execute_Service('File_System');

In the exemplary instruction above, the function 'Execute_Service' is a function that instructs the kernel to execute the operating system service specified in the kernel policy (122) for the service type (305) having a value of 'File_System.' Including such an exemplary instruction in the computer program instructions implementing the kernel specifies that the operating system use a service of the file system service type. Readers will note that the exemplary instruction above is for explanation and not for limitation. Other instructions as will occur to those of skill in the art may also be useful in providing policy-based operating system services in an operating system on a computing system according to embodiments of the present invention.

The method of FIG. 4 includes retrieving (303), by the kernel, the specified operating system service (400) from the kernel policy (122) in dependence upon the specified service type (305). Retrieving (303), by the kernel, the specified operating system service (400) from the kernel policy (122) in dependence upon the specified service type (305) according to the method of FIG. 4 may be carried out by looking up in the kernel policy (122) the operating system service identifier (302) associated with the service type (304) having the same value as the specified service type (305).

The method of FIG. 4 includes adjusting (404) the operating parameters (402) of the specified operating system service (400) in dependence upon the performance ruleset (131) and the measured performance (318). The operating parameters (402) of FIG. 4 represent values used by the computer program instructions implementing the specified operating system service (400) to perform the specified operating system service (400). For example, in a memory management operating system service, the operating parameters may include a value that indicates the number of pages that the memory management system service will allocate to each process. Adjusting (404) the operating parameters (402) of the specified operating system service (400) according to the method of FIG. 4 may be carried out by the kernel or the administration module mentioned above. The administration module may adjust (404) the operating parameters (402) of the specified operating system service (400) according to the method of FIG. 4 by comparing the measured performance (318) with the criteria (312) for each record in the performance ruleset (131). If the measured performance (318) satisfies the criteria (312) of one of the records, then the administration module may execute the action (314) associated with the criteria (312) satisfied by the measured performance (318). The action (314) associated with the criteria (312) satisfied by the measured performance (318) may identify computer program instructions for carrying out adjustments to the operating parameters (402). Such adjustments advantageously operate to reconfigure the operating system services used by the kernel in the operating system in an effort to optimize the performance of the computing system or adapt the computing system to a changing environment.

In addition to adjusting the kernel policy or the operating parameters of an operating system service specified in a kernel policy in dependence upon a performance ruleset and measured performance of the computing system, the operating system service nodes of a computing system may administered in dependence upon the performance ruleset and the measured performance. For further explanation, therefore, FIG. 5 sets forth a flow chart illustrating a further exemplary method for providing policy-based operating system services in an operating system on a computing system according to embodiments of the present invention that includes administering (506) the operating system service nodes in dependence upon a performance ruleset (131) and measured performance (318). The computing system is implemented as a distributed computing system that includes at least one compute node and one or more operating system service nodes. The compute node includes an operating system that includes a kernel and a plurality of operating system services of a service type. One or more of the operating system services are distributed among the operating system service nodes.

Figure 5:
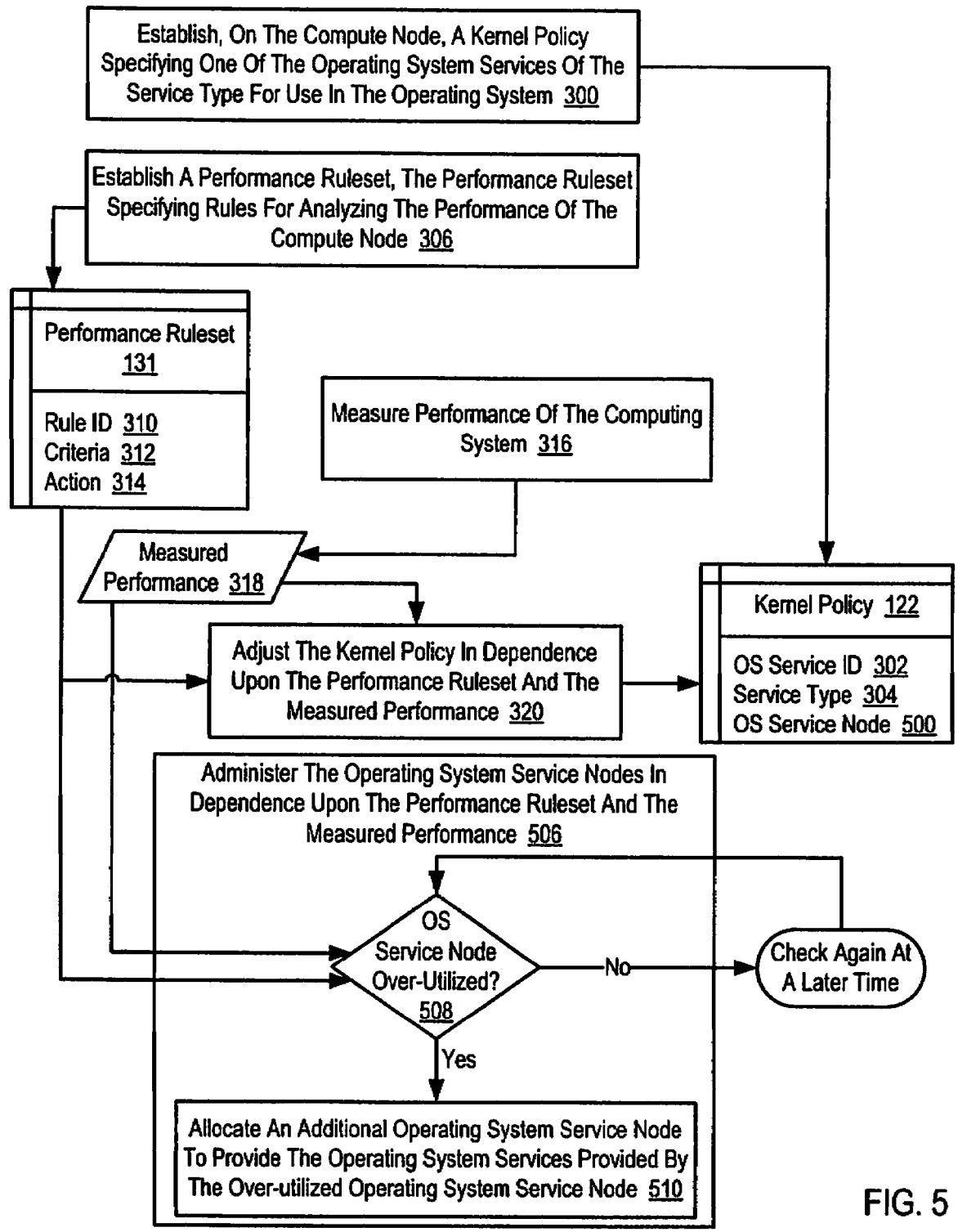
FIG. 5 sets forth a flow chart illustrating a further exemplary method for providing policy-based operating system services in an operating system on a computing system according to embodiments of the present invention.

The method of FIG. 5 is similar to the method of FIG. 3 in that the method of FIG. 5 includes establishing (300), on the compute node, a kernel policy (122) specifying one of the operating system services of the service type for use by the kernel in the operating system, establishing (306) a performance ruleset (131), the performance ruleset (131) specifying rules for analyzing the performance of the computing system, measuring (316) performance (318) of the computing system, and adjusting (320) the kernel policy (122) in dependence upon the performance ruleset (131) and the measured performance (318). The example of FIG. 5 is also similar to the example of FIG. 3 in that the kernel policy (122) includes an operating system service identifier (302) and a service type (304). In the example of FIG. 5, however, the kernel policy (122) also specifies an operating system service node that is to provide each specified operating system service by including an operating system service node identifier (500) in each record. The example of FIG. 5 is also similar to the example of FIG. 3 in that the performance ruleset (131) includes rule identifier (310), criteria (312), and an action (314).

The method of FIG. 5 also includes administering (506) the operating system service nodes in dependence upon the performance ruleset (131) and the measured performance (318). Administering (506) the operating system service nodes in dependence upon the performance ruleset (131) and the measured performance (318) according to the method of FIG. 5 includes determining (508) whether one of the operating system service nodes is over-utilized in dependence upon the performance ruleset (131) and the measured performance (318). An over-utilized operating system service node is a node whose available processor utilization for providing operating system services is less than a predetermined portion of the total processor utilization of the node's processors. The predetermined portion of the total processor utilization of the node's processors used to identify an over-utilized operating system service node may be specified in the criteria (312) of the performance ruleset. Determining (508) whether one of the operating system service nodes is over-utilized according to the method of FIG. 5, therefore, may be carried out by retrieving the measured performance (318) from one of the operating system service nodes and comparing the measured performance (318) of the node with the criteria (312) for each record in the performance ruleset (131) specifying an over-utilized node condition. If the measured performance (318) of a node satisfies the criteria (312) of one of the records, then the administration module determines that the node whose measured performance (318) satisfies the criteria (312) is an over-utilized operating system service node. If the measured performance (318) of a node does not satisfy the criteria (312) of one of the records, then the administration module retrieves the measured performance from the node at a later time and again determines at the later time whether the node is over-utilized.

Administering (506) the operating system service nodes in dependence upon the performance ruleset (131) and the measured performance (318) according to the method of FIG. 5 also includes allocating (510) an additional operating system service node to provide the operating system services provided by the over-utilized operating system service node. Allocating (510) an additional operating system service node to provide the operating system services provided by the over-utilized operating system service node according to the method of FIG. 5 may be carried out by executing, by the administration module, the action (314) associated with the criteria (312) used to determine that the node was over-utilized. The action (314) associated with the criteria (312) used to determine that the node was over-utilized may identify computer program instructions for carrying out the allocation of an additional operating system service node. Such an allocation may include configuring an available node with operating system services and a service server that enable the node to provide operating system services to a compute node. Such an allocation may also include updating the kernel policy (122) established on one or more compute nodes to enable the kernels of these compute nodes to utilize the operating system services provided by the newly allocated operating system service node.

Instead of allocating an additional operating system service node to provide the operating system services provided by the over-utilized operating system service node, administering the operating system service nodes in dependence upon a performance ruleset and measured performance may also include reconfiguring an under-utilized operating system service node. For further explanation, therefore, FIG. 6 sets forth a flow chart illustrating a further exemplary method for providing policy-based operating system services in an operating system on a computing system according to embodiments of the present invention that includes reconfiguring (604) an under-utilized operating system service node if more than one operating system service node provides the same operating system services as the under-utilized operating system service node. The computing system is implemented as a distributed computing system that includes at least one compute node and one or more operating system service nodes. The compute node includes an operating system that includes a kernel and a plurality of operating system services of a service type. One or more of the operating system services are distributed among the operating system service nodes.

Figure 6:
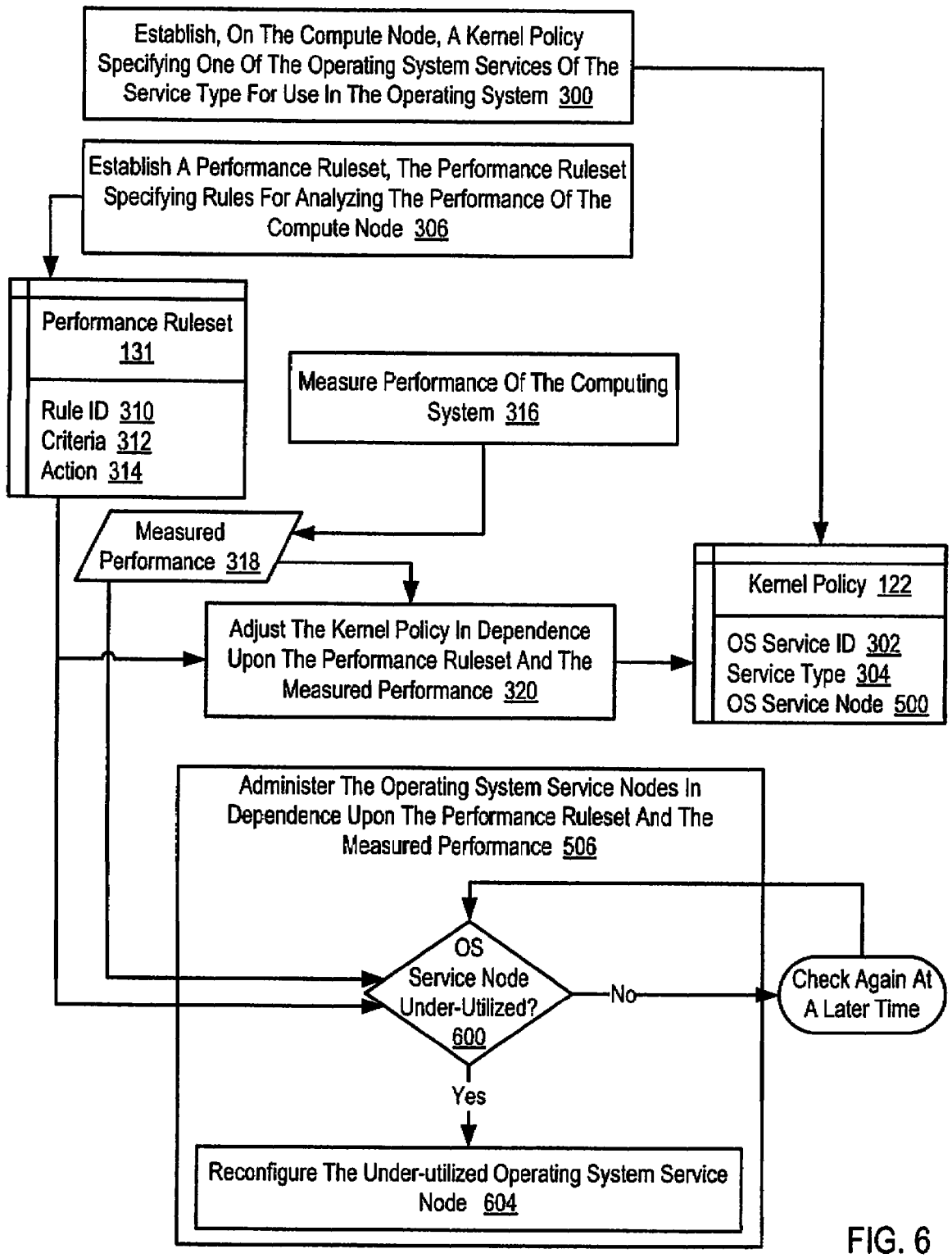
FIG. 6 sets forth a flow chart illustrating a further exemplary method for providing policy-based operating system services in an operating system on a computing system according to embodiments of the present invention.

The method of FIG. 6 is similar to the method of FIG. 3 in that the method of FIG. 6 includes establishing (300), on the compute node, a kernel policy (122) specifying one of the operating system services of the service type for use by the kernel in the operating system, establishing (306) a performance ruleset (131), the performance ruleset (131) specifying rules for analyzing the performance of the computing system, measuring (316) performance (318) of the computing system, and adjusting (320) the kernel policy (122) in dependence upon the performance ruleset (131) and the measured performance (318). The example of FIG. 6 is also similar to the example of FIG. 3 in that the kernel policy (122) includes an operating system service identifier (302) and a service type (304). In the example of FIG. 6, however, the kernel policy (122) also specifies an operating system service node that is to provide each specified operating system service by including an operating system service node identifier (500) in each record. The example of FIG. 6 is also similar to the example of FIG. 3 in that the performance ruleset (131) includes rule identifier (310), criteria (312), and an action (314).

The method of FIG. 6 also includes administering (506) the operating system service nodes in dependence upon the performance ruleset (131) and the measured performance (318). Administering (506) the operating system service nodes in dependence upon the performance ruleset (131) and the measured performance (318) according to the method of FIG. 6 includes determining (600) whether one of the operating system service nodes is under-utilized in dependence upon the performance ruleset and the measured performance. An under-utilized operating system service node is a node whose available processor utilization for providing operating system services is more than a predetermined portion of the total processor utilization of the node's processors. The predetermined portion of the total processor utilization of the node's processors used to identify an under-utilized operating system service node may be specified in the criteria (312) of the performance ruleset. Determining (600) whether one of the operating system service nodes is under-utilized according to the method of FIG. 6, therefore, may be carried out by retrieving the measured performance (318) from one of the operating system service nodes and comparing the measured performance (318) of the node with the criteria (312) for each record in the performance ruleset (131) specifying an under-utilized node condition. If the measured performance (318) of a node satisfies the criteria (312) of one of the records, then the administration module determines that the node whose measured performance (318) satisfies the criteria (312) is an under-utilized operating system service node. If the measured performance (318) of a node does not satisfy the criteria (312) of one of the records, then the administration module retrieves the measured performance from the node at a later time and again determines at the later time whether the node is under-utilized.

Administering (506) the operating system service nodes in dependence upon the performance ruleset (131) and the measured performance (318) according to the method of FIG. 6 also includes reconfiguring (604) the under-utilized operating system service node. In the method of FIG. 6, reconfiguring (604) the under-utilized operating system service node may be carried out by executing, by the administration module, the action (314) associated with the criteria (312) used to determine that the node was under-utilized. The action (314) associated with the criteria (312) used to determine that the node was under-utilized may identify computer program instructions for carrying out the reconfiguration of the under-utilized operating system service node. Such a reconfiguration may include reconfiguring the under-utilized node to provide additional operating system services to utilize the currently available processing bandwidth. Such a reconfiguration may also include reconfiguring the under-utilized node to provide the same operating system services to a larger number of compute nodes to utilize the currently available processing bandwidth. Such a reconfiguration may also include de-allocating the under-utilized operating system service node if more than one operating system service node provides the same operating system services as the under-utilized operating system service node. Such a reconfiguration may further include updating the kernel policy (122) established on one or more compute nodes to enable the kernels of these compute nodes to utilize the operating system services in a manner that reflects the reconfiguration of the under-utilized operating system service node.

In view of the explanations set forth above, readers will recognize that the benefits of providing policy-based operating system services in an operating system on a computing system according to embodiments of the present invention include:
 the ability to configure operating system services used in an operating system based upon the hardware and software environment managed by the operating system,
 the ability to adapt an operating system to a new environment or to meet new requirements by providing a variety of operating system services for use by the kernel of the operating system, and
 the ability to dynamically adjust an operating system to changing conditions in a computing environment by reassigning operating system services used by the kernel of the operating system according to the changed conditions.

Exemplary embodiments of the present invention are described largely in the context of a fully functional computing system for providing policy-based operating system services in an operating system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing policy-based operating system services in an operating system on a computing system,
    the computing system comprising one or more compute nodes, each compute node comprising a separate operating system, each operating system further comprising a kernel and a plurality of operating system services of a service type, the method comprising:
    establishing, on at least one compute node, a kernel policy specifying one of the operating system services of the service type for use by the kernel in the operating system;
    establishing a performance ruleset, the performance ruleset specifying rules for analyzing the performance of the computing system;
    measuring performance of the computing system; and
    adjusting the kernel policy in dependence upon the performance ruleset and the measured performance.

2. The method of claim 1 wherein each operating system service is characterized by operating parameters, the method further comprising:
    adjusting the operating parameters of the specified operating system service in dependence upon the performance ruleset and the measured performance.

3. The method of claim 1 wherein:
    the computing system is a distributed computing system further comprising one or more operating system service nodes;
    one or more of the operating system services are distributed among the operating system service nodes; and
    the kernel policy also specifies an operating system service node that is to provide the specified operating system service.

4. The method of claim 3 wherein the distributed computing system is a parallel computer.

5. The method of claim 3 wherein measuring performance of the computing system further comprises measuring performance of the compute node.

6. The method of claim 3 wherein measuring performance of the computing system further comprises measuring performance of the operating system service nodes.

7. The method of claim 3 further comprising:
    administering the operating system service nodes in dependence upon the performance ruleset and the measured performance.

8. The method of claim 7 wherein administering the operating system service nodes in dependence upon the performance ruleset and the measured performance further comprises:
    determining whether one of the operating system service nodes is over-utilized in dependence upon the performance ruleset and the measured performance; and
    allocating an additional operating system service node to provide the operating system services provided by the over-utilized operating system service node.

9. The method of claim 7 wherein administering the operating system service nodes in dependence upon the performance ruleset and the measured performance further comprises:
    determining whether one of the operating system service nodes is under-utilized in dependence upon the performance ruleset and the measured performance; and
    reconfiguring the under-utilized operating system service node.

* * * * *